United States Patent [19]

Danley

[11] Patent Number: 4,757,547

[45] Date of Patent: Jul. 12, 1988

[54] AIR COOLED LOUDSPEAKER

[75] Inventor: Thomas J. Danley, Highland Park, Ill.

[73] Assignee: Intersonics Incorporated, Northbrook, Ill.

[21] Appl. No.: 95,398

[22] Filed: Sep. 10, 1987

[51] Int. Cl.[4] .................... H04B 1/00

[52] U.S. Cl. .................... 381/165; 381/124; 381/194

[58] Field of Search .................... 381/165, 192, 194, 199, 381/201, 124

[56] References Cited

U.S. PATENT DOCUMENTS 4,564,727 1/1986 Danley et al. .................... 381/162

FOREIGN PATENT DOCUMENTS 0036919 3/1979 Japan .................... 381/192

0148499 8/1984 Japan .................... 381/165

*Primary Examiner*—L. T. Hix

*Assistant Examiner*—David Porterfield

*Attorney, Agent, or Firm*—Juettner Pyle Lloyd & Verbeck

[57] ABSTRACT

An electrical blower is used to pass cooling air through a loudspeaker driver. The blower is connected in parallel to the leads between the amplifier and speaker such that the blower speed and cooling increases with increased power consumption and heat generation by the driver.

6 Claims, 2 Drawing Sheets

AIR COOLED LOUDSPEAKER

BACKGROUND OF THE INVENTION

This invention relates to loudspeakers which produce sound in response to an audio signal. In particular, this invention relates to a loudspeaker which is capable of handling sustained high power levels without substantial loss of efficiency due to resistance heating.

Most modern loudspeakers employ a diaphragm which is vibrated by an electromechanical drive. In a conventional dynamic loudspeaker, the drive includes a voice coil which is connected to the audio amplifier. The voice coil is suspended between the pole pieces of a permanent magnet and is connected to a speaker cone. It is also known, for example, in U.S. Pat. No. 4,564,727, to drive a speaker diaphragm with a commutated motor, especially for the purpose of producing low frequency sound.

From the above, it may be seen that most loudspeaker drivers employ coils or windings of conductive material, which carry alternating DC current for their operation. In operation, the resistance of the conductive material causes production of heat and an increased temperature in the voice coil or winding. Because the DC resistance comprises a major portion of a driver's impedance, most of the input power is converted into heat rather than sound. As a result, the ultimate power handling capacity of a driver is strictly limited by the ability of the device to tolerate heat. This, in turn, may be determined by factors such as melting points of the components and heat capacity of the adhesive used to construct the voice coil.

The problems of heat generation is further compounded by temperature induced resistance, commonly referred to as power compression. The D.C. resistance of copper or aluminum conductors or wires used in the driver increases as the temperature increases. For example, a copper wire voice coil having a room temperature resistance of six ohms will have a resistance of twelve ohms at 230° C., which will occur when power input is increased. Thus, a point is soon reached at which additional power input will be converted mostly into additional heat rather than sound, thereby posing a serious limitation or driver efficiency.

No adequate solution has been forthcoming to deal with or resolve the problems of poor heat capacity or power compression. Any proposed solution has involved trade-offs. For example, it is possible to use heavier and thicker wire in the voice coil to reduce resistance, but this increases the moving mass and decreases efficiency.

SUMMARY OF THE INVENTION

The present invention provides an arrangement in which ambient air is placed under positive pressure and is caused to flow selectively over the current carrying windings or coil in the driver. This is accomplished by providing suitable air inlets and outlets in the driver which are connected to a remote power blower or suction device.

The cooling unit or blower may be driven by a small high efficiency motor, and the blower may be pneumatically connected to the speaker drive by a suitable conduit or hose. The same power used to drive the speaker may be used to drive the blower motor, such that the rate of heat removal from the driver is proportional to the power consumed and heat generated. The cooling device therefore serves to maintain the operating temperature of the driver at a constant and lower level, thereby protecting the drive from thermal damage and greatly improving performance and efficiency.

THE DRAWINGS

DESCRIPTION OF THE PREFERRED EMBODIMENTS

Figure 1:
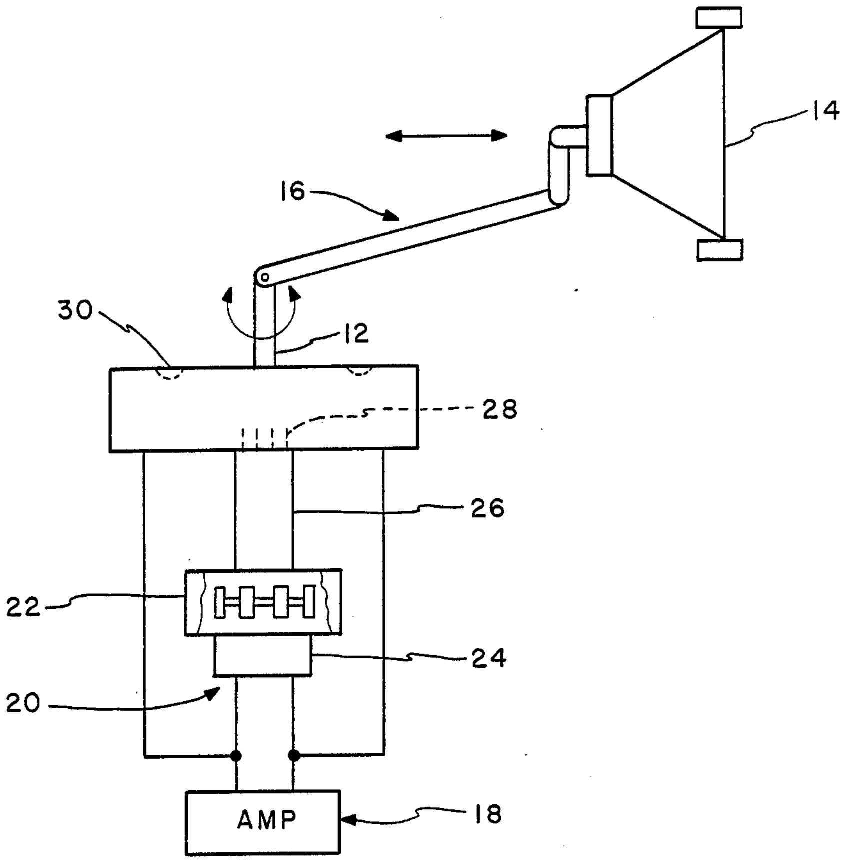
FIG. 1 is a side schematic view of an air cooled loudspeaker which incorporates features of the presently described invention.

FIG. 1 illustrates a loudspeaker of the type described in U.S. Pat. No. 4,564,727, incorporated herein by reference. A commutated DC servomotor 10 has a rotary output shaft 12 which is connected to a sound diaphragm or loudspeaker cone 14 by a suitable linkage 16 to convert reversing rotary output at the shaft to reciprocating linear motion at the base of the cone. The motor is electrically connected to, and driven by, a source of amplifier acoustic electrical signal, generally indicated at 18.

The motor or driver 10 is conventional in nature and has internal conductive windings which carry the power from the amplifier 18. This, in turn, causes the shaft 12 to rotate back and forth and drive the speaker cone 14. In so doing, the resistance within the windings of the motor causes generation of heat, which may ultimately lead to power compression and loss of efficiency.

As shown in FIG. 1, means are provided for cooling the driver or motor 10. A power blower 20 of conventional design is employed, such as the type used in a small vacuum cleaner. The blower comprises a turbine 22 which is rotatably driven by a small high efficiency motor 24. The inlet of the blower 20 is connected to one end of a conduit or hose 26, and the other end is connected to air outlets or vents 28 of the motor 10. The other side of the motor 10 is provided with air inlets such as 30 to provide air passageways through the interior of the motor and over the electrical windings.

As shown, the blower motor 24 is connected to parallel with the leads from the amplifier 18 to the speaker driver 10. As power is supplied to the driver 10, the blower 20 is operational. As power levels increase, the speed of the blower motor is increased to enhance cooling capacity. Preferably, the blower 20 is arranged such as to draw outside air at ambient temperature through the motor 10, although beneficial results are obtained with air flow in either direction.

It will be seen in FIG. 1 that the amount of current supplied from the amplifier 18 to the drive motor 10 is proportional to the current supplied to the blower 20. Hence, as power consumption and heat generation in the driver motor increases, the blower motor operates at a higher speed to remove the additional heat generated.

Figure 2:
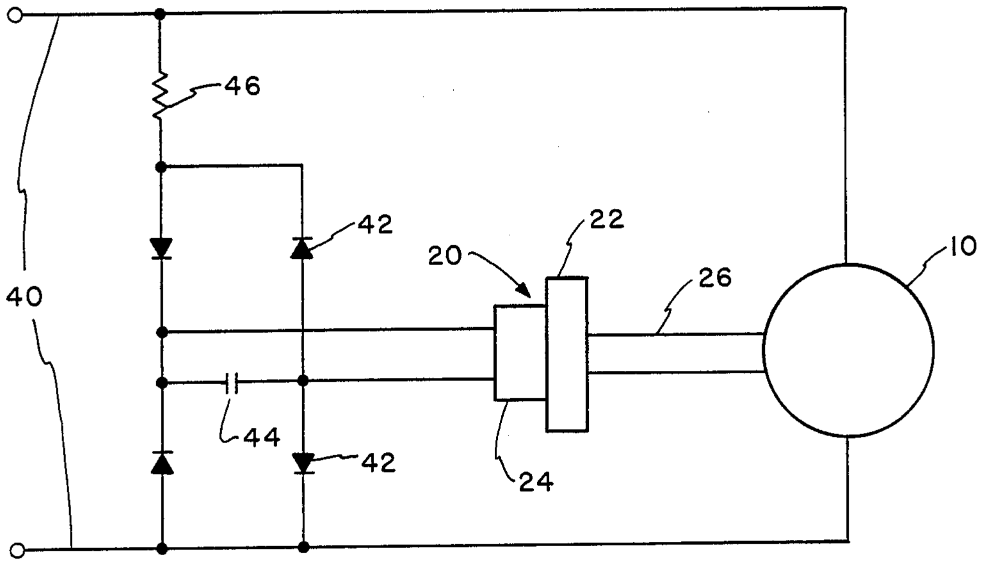
FIG. 2 is a schematic view similar to FIG. 1, illustrating additional details of the preferred electrical circuit.

In the preferred embodiment, the alternating current from the amplifier 18 is converted into direct current at the motor for most efficient operation. As shown in FIG. 2, the leads 40 from the amplifier are connected to a conventional rectifier comprising diodes 42 in the usual fashion. A capacitor 44 may be inserted across the circuit to smooth out current flow. A resistor 46 may be connected between one of the leads 40 and the rectifier to limit the peak current to the rectifier and blower. Due to the relatively high efficiency of the blower motor, only a small fraction of the amplifier power, usually less than one dB, is employed in the cooling process. At the same time, the power handling capacity of the driver is greatly increased, and power compression is significantly reduced.

Figure 3:
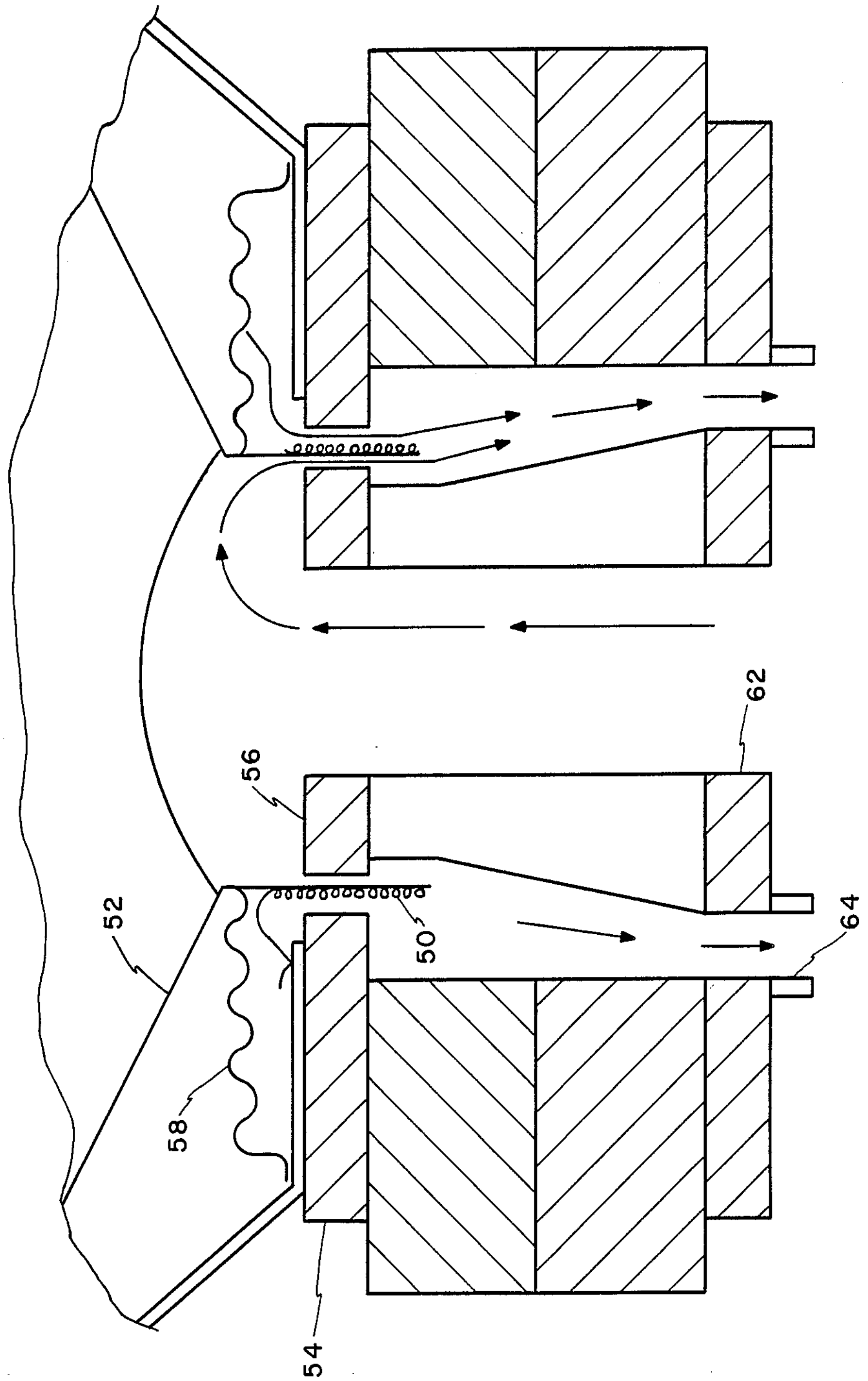
FIG. 3 is a vertical sectional view of a conventional voice coil speaker with internal modifications to allow power cooling.

FIG. 3 illustrates a conventional loudspeaker comprising an annular voice coil 50 attached to a speaker cone 52. The voice coil 50 is suspended in the annular gap between the pole pieces 54 and 56 of a permanent magnet by means of a porous spider 58. The leads 60 of the voice coil are connected to an amplifier in the usual fashion.

The loudspeaker includes air passageways to allow a forced movement of air over the voice coil 50. For example, the speaker may include a central line 62 from the rear and a rear outlet 64 between the pole pieces. The outlet 64 is connected to the power blower described in the previous embodiment. In operation, air is drawn through the inlet 62 and through the porous spider 58 and over the voice coil 50. In this embodiment also, the power blower is connected in parallel with the voice coil, such that cooling increases with power consumption.

I claim:

1. An air cooled loudspeaker comprising a sound diaphragm, motor means connected to said diaphragm for vibration thereof in response to an audio signal source, and an electrical blower means pneumatically connected to said motor means for causing cooling air flow through said motor means said electrical blower means being electrically connected in parallel between said motor means and said audio signal source such that air flow through the motor increases with increased power consumption and heat generation by the motor means.

2. The air cooled loudspeaker of claim 1 wherein the blower means is spaced from the motor means and is connected thereto by a conduit.

3. The air cooled loudspeaker of claim 1 wherein the motor means is a DC servomotor.

4. The air cooled loudspeaker of claim 1 wherein the motor means comprises a voice coil connected to the sound diaphragm.

5. The air cooled loudspeaker of claim 1 further comprising means for rectifying power to said electrical blower means.

6. A method of improving the performance of a loudspeaker having a sound diaphragm driven by a motor comprising a conductive coil connected to an audio current source, said method comprising the steps of passing a flow of cooling air over the conductive coil, and increasing said flow of cooing air in response to increased passage of current through said coil.

* * * * *